(12) United States Patent
Hamilton et al.

(10) Patent No.: US 8,366,807 B2
(45) Date of Patent: Feb. 5, 2013

(54) METHOD FOR REMOVING HEAVY METALS FROM GASES

(75) Inventors: Hugh Gavin Charles Hamilton, Reading (GB); Stephen Poulston, Reading (GB)

(73) Assignee: Johnson Matthey Public Limited Company, London (GB)

( * ) Notice: Subject to any disclaimer, the term of this patent is extended or adjusted under 35 U.S.C. 154(b) by 342 days.

(21) Appl. No.: 12/304,063

(22) PCT Filed: Jun. 6, 2007

(86) PCT No.: PCT/GB2007/050321
§ 371 (c)(1),
(2), (4) Date: Dec. 9, 2008

(87) PCT Pub. No.: WO2007/141577
PCT Pub. Date: Dec. 13, 2007

(65) Prior Publication Data
US 2010/0229722 A1    Sep. 16, 2010

(30) Foreign Application Priority Data

Jun. 9, 2006 (GB) .................................. 0611316.1

(51) Int. Cl.
*B01D 53/04* (2006.01)
(52) U.S. Cl. .......................................... 95/133; 95/134
(58) Field of Classification Search .................. 95/133, 95/134, 148; 423/22
See application file for complete search history.

(56) References Cited

U.S. PATENT DOCUMENTS

| | | | |
|---|---|---|---|
| 4,094,777 A | 6/1978 | Sugier | |
| 4,814,152 A | 3/1989 | Yan | |
| 5,080,799 A | 1/1992 | Yan | |
| 5,281,258 A | 1/1994 | Markovs | |
| 5,401,392 A | 3/1995 | Courty et al. | |
| 5,531,886 A | 7/1996 | Cameron | |
| 5,601,701 A | 2/1997 | Cameron et al. | |
| 7,033,419 B1 | 4/2006 | Granite et al. | |

FOREIGN PATENT DOCUMENTS

| | | |
|---|---|---|
| EP | 0 480 603 A2 | 4/1992 |
| EP | 0 480 603 A3 | 4/1992 |
| JP | 11104432 | 4/1999 |

OTHER PUBLICATIONS

William G. Moffatt, PhD, *The Handbook of Binary Phase Diagrams* (Schenectady, NY: Genium Publishing Corporation, Jan. 1990), p. 3/86.
Takaoka et al., "Removal of Mercury in Flue Gas by the Reaction with Sulfide Compounds," *Toxicological and Environmental Chemistry*, 1999, vol. 73, pp. 1-16.

*Primary Examiner* — Duane Smith
*Assistant Examiner* — Christopher P Jones
(74) *Attorney, Agent, or Firm* — RatnerPrestia

(57) ABSTRACT

In the removal of heavy metals such as mercury from fluid streams, especially coal-derived syn-gas streams, a sulphided palladium-containing absorber gives improved results by way of mercury-absorption capacity if the absorber is sulphided.

15 Claims, No Drawings ions. This is seen where ambient gas sorbents are soaked in strong mercury chloride solutions. A second pre-treatment to be considered is pre-reduction of the sorbent, to metallic palladium, the effect of which is currently being investigated.

METHOD FOR REMOVING HEAVY METALS FROM GASES

CROSS-REFERENCE TO RELATED APPLICATIONS

This application is the U.S. National Phase application of PCT International Application No. PCT/GB2007/050321, filed Jun. 6, 2007, and claims priority of British Patent Application No. 0611316.1, filed Jun. 9, 2006, both of which are incorporated herein by reference.

FIELD OF THE INVENTION

This invention concerns improvements in the removal of metals from fluid streams. More specifically, it concerns the removal of heavy metals, especially mercury, but also metals such as arsenic and selenium, and possibly cadmium, from process gas streams, to reduce both their impact on downstream gas processing and their eventual release into the environment.

BACKGROUND OF THE INVENTION

Combustion gases from, for example, coal-fired power plants, can be a significant source of the release of heavy metals into the environment. Similarly, gases from crematoria can contain mercury emissions from tooth fillings, and possibly other heavy metals. Other sources of metal emissions include cement kilns, chlor-alkali cells and artesianal gold-mining. There is a rapidly growing realisation that effective technology is required to permit the removal of such heavy metals from oxygen-rich gas streams such as fossil fuel combustion gases which are released directly into the atmosphere.

In addition to removal of these heavy metals from directly released, oxidising, gas streams, there is a similarly increasing requirement for their removal from process gas streams, where their presence can, for example, be deleterious to subsequent downstream processes, especially those involving catalysed change of the gas stream composition or use of the gas stream for generating power. For example, currently in the United States, the potential use of huge supplies of coal to generate hydrogen-rich fuel gas (or syn-gas) via coal gasification processes is receiving growing attention as the price of imported oil increases. Coal contains toxic heavy metals in varying proportions and the ability to remove these metals cheaply and efficiently from the resultant fuel gas would be of great commercial benefit.

The conditions encountered in such combustion and fuel gases are, however, technically challenging. In the case of coal combustion gas streams, for example, these include large amounts of flyash, the presence of toxic metals such as mercury and arsenic and toxic gases such as sulphur and nitrogen oxides, potentially corrosive halide species, all present in huge volumes of gas at atmospheric pressure. In the case of the coal gasification-derived fuel gas, for example, the gas leaves the gasifier at high temperatures, for example >700° C., and high pressures, for example up to 70-80 bar. Current technology, for example as used in a plant in the United States, requires that the gas be cooled to near ambient temperatures for removal of toxic metals such as mercury via adsorption onto carbon beds. Downstream processing can then require that the cleaned gas be re-heated. It has previously been estimated that the ability to remove toxic metals from the fuel gas stream at elevated temperatures could result in around a 3% improvement in energy efficiency for the plant, because it is thermodynamically undesirable to cool the gases to allow some methods of heavy metal removal.

The US Department of Energy's National Energy Technology Laboratory has identified, in U.S. Pat. No. 7,033,419, that mercury can be removed from fuel gases using precious metal-containing absorbents. There remain, however, technical challenges to be overcome before a commercial-scale mercury absorbent can be developed.

U.S. Pat. No. 4,814,152 (Mobil Oil Corp) discloses a process for removing mercury from a gas using an inert support which contains at least about 5 wt % of elemental sulphur, and a catalyst (which may be platinum or palladium) which catalyses the reversible reaction $2Hg+S_2=2HgS$ at a temperature of not more than 170° C.

U.S. Pat. No. 5,601,701 (Institut Francais du Petrole) discloses the removal of mercury from hydrocarbon fractions, using a catalyst bed and a mercury retention bed. The catalyst may be a partially-sulphided supported metal, preferably nickel or an association of nickel and palladium. If palladium is present, it should not exceed 0.2% of the catalyst. The catalytic process operates at temperatures of 120-250° C. The mercury retention bed which follows the catalyst bed is suitably composed of copper sulphide, tin dichloride or potassium iodate.

SUMMARY OF THE INVENTION

The present invention provides a method of reducing the levels of heavy metals in process-derived gas streams over a range of temperatures and pressures, especially in high temperature, oxygen-deficient gas streams and most especially in the temperature range desirable for application within a gasification-derived fuel gas stream, at temperature higher than about 200° C. It is believed that the method operates at temperatures up to about 400° C. The method of the invention comprises passing the gases over an absorbent material, characterised in that the absorbent is a sulphided palladium-containing absorbent, and is preferably a pre-sulphided absorbent. The absorbent preferably is palladium deposited on a support, at a loading of palladium of greater than about 1.5 wt %, suitably at about 2 wt %. Tests have been successful with supported absorbents having 5 wt % and 10 wt % Pd on alumina. The tests have shown that the amount of mercury removed increases with increases in palladium loading, but the highest Hg:Pd ratio is for 2 wt % Pd on alumina. However, it is recognised that un-supported palladium materials such as powders, sponges or gauzes may also be of use in carrying out the present invention.

DETAILED DESCRIPTION OF THE INVENTION

Initial tests comparing the sulphided absorbents with other possible ionic forms of palladium absorbent, for example using palladium chloride deposited on alumina to form an absorbent, did not show the same results as with sulphiding, but such tests are continuing. Further, a pre-treatment step of reducing the absorbent before use, does not cause any increase in the quantity of mercury absorbed.

Initial tests indicate that the mercury absorption activity did not change upon sulphiding, but the capacity for absorbed mercury was increased.

The absorbents used in the present invention may be subjected to treatments in addition to sulphiding in order to improve performance. One pre-treatment to be considered is pre-washing the sorbent in a mercury chloride solution, which may increase rates of amalgamation.

According to the invention, the preferred absorbent is essentially solely palladium-containing, but this does not exclude the addition of other components, whether metallic or non-metallic.

The invention also provides heavy metal absorbing equipment, comprising ducting means for conveying high temperature gases, and, disposed within the ducting, an absorbent material, characterised in that the absorbent comprises a sulphided palladium absorbent, and preferably comprises a pre-sulphided palladium absorbent.

Preferably, the absorbent comprises palladium deposited on a support, especially on alumina particles. Initial tests have shown that gamma and alpha alumina as well as the zeolite ZSM-5 are suitable for use in this invention, and it is expected that other support materials stable in the specific gaseous environment, such as those typically used for supporting active metal phases in catalytic applications, would also be suitable. Such supports could include, either individually or in combination, silica, titania, zirconia, aluminosilicates, yttria and inactive carbon-based materials. It is expected that more suitable supports would be those also possessing moderate to high surface areas.

It is envisaged that the absorbent material could be used in a variety of physical forms to purify contaminated gas streams. The absorbent could make up the totality of the absorbing system or could be further supported on an inert matrix such as a monolithic support or on beads, pellets or rings typically used in the design of fixed bed systems. Coating of the absorbent on these inert supports can be carried out using a variety of processes known per se, and would provide the benefit of reducing the cost of the absorbent system as well as permitting modification of factors such as pressure drop and thermal gradients across the absorbent bed. It is preferred to carry the absorbent upon a support, and thus to impregnate the desired support with an aqueous solution of a palladium precursor such as the nitrate and, after drying, to fire the product. It is contemplated that deposition of a suitable precursor such as palladium sulphate with a reduction step may permit a simple alternative route to a palladium sulphide absorbent, and it is planned to carry this out.

In most fossil fuel-derived gas streams, sulphur is present. A certain amount of in situ sulphidation can therefore be expected in gas streams of a chemically reducing nature or in which, for example, hydrogen sulphide is present. However, many, if not most, plants have a sulphur removal stage, and if the mercury removal absorption is positioned after such a sulphur removal stage, the sulphur concentrations may be too low to be able to carry out significant in situ sulphidation.

It is presently thought that it is advantageous to treat the absorbent in a discrete pre-sulphidation step prior to the introduction of the absorbent into the contaminated gas stream. The role of the pre-sulphiding step is thought to be to generate "Pd—S" phase/s within the absorbent material, and especially the crystalline $Pd_4S$ phase has been detected.

Accordingly, the invention further provides a method of absorbing heavy metal, especially mercury, from high temperature gases, comprising using as an absorber a palladium-based absorber comprising $Pd_4S$ phase. It should be understood that not every effective sulphided absorbent according to the invention contains a crystalline $Pd_4S$ phase.

A presulphidation of a Pd on alumina absorber may be carried out, for example, by passing a dilute mixture of $SO_2$, for example in an inert or, preferably, reducing gas, such as 1% $H_2$ in $N_2$, at elevated temperature, for example at 300° C. for several hours. Tests using $H_2S$ as a source of sulphur have been successfully carried out, with good mercury adsorption results. Other sulphiding techniques are, however, contemplated.

Sulphiding of certain catalysts is known. The absorbents used in the present invention are not believed to operate as catalysts. The use of sulphided copper and carbon absorbents is known, but these are effective for mercury removal only at low temperatures such as below 100° C. EP 480 603, however, discloses that it is preferred to sulphide in situ because a pre-sulphided copper absorbent loses activity. Such materials cannot operate successfully under the temperatures and other conditions contemplated for the present invention. For example, the in-situ sulphided Cu absorbents of EP 480 603 are extremely sensitive to the presence of water or water vapour, which is always present in fuel gas streams. Additionally, our tests have demonstrated that platinum, frequently assumed to be extremely similar to palladium, has a completely different result, with a pre-sulphided Pt absorber actually having reduced Hg-absorption activity compared to a non-sulphided Pt absorber.

Early indications are that the sulphided palladium-based absorber used in the invention can absorb up to twice as much mercury as a more conventional palladium absorber. This is thought to be because of the formation of a distinct HgPd phase, which is not formed in the case of the unsulphided samples, in which case Hg absorption leads to a solid solution of Hg in Pd. The solid solution appears to be limited to a maximum Hg concentration of 16 at % at 204° C. as indicated in the phase diagram (The Handbook of Phase Diagrams Vol iv, W.G. Moffatt, Genium Publishing Corporation).

The invention further provides a method of absorbing mercury from high temperature gases, characterised in that the mercury forms a HgPd phase.

A sulphided Pd on alumina absorbent additionally shows an advantageous reduction in undesired catalytic activities which could reduce overall yields of syn-gas. That is, the syn-gas is prone to methanation and water gas shift reactions which can be catalysed by Pd on alumina. Pre-sulphiding the catalyst reduces methanation significantly, and also reduces water gas shift, although to a lesser extent.

The mercury, or other heavy metal, can be recovered from the absorbent in due course. Methods to be considered include heating to temperatures suitable to cause decomposition of the mercury-palladium phase and subsequent deamalgamation and/or release of mercury sulphide. Metallic mercury could be collected where appropriate, for example, by condensation. This process may result in partial loss of the sulphide component depending on the regeneration conditions used. However, optimisation of recovery and recycling methods may be expected to result in economic re-use of the absorbent.

EXAMPLES

The invention will now be described with reference to the following Examples.

Example 1

Mercury Loading

A variety of palladium-based absorbers, and one platinum-based absorber, were prepared. Each sample was split into two, and one half was pre-sulphided by treatment at 300° C. for 20 hours in a flowing gas stream of 40 ppm $SO_2$ in 1% $H_2$ in $N_2$. In one case, a sample was pre-reduced by treatment under identical conditions to the pre-sulphiding, but using a gas having only 1% $H_2$ in $N_2$, and no $SO_2$.

Mercury absorption capacities were assessed for the samples listed in Table 1 in a microreactor, by passing a 2000 ng/min of Hg in a carrier gas of 5% $CO_2$, 35% $H_2$, 15% $N_2$ and balance CO. The Hg concentration was 4.5 ppm.

TABLE 1

| loading metal/ wt % † | Hg content/wt % at different furnace temperatures and sample pretreatments | | | | |
|---|---|---|---|---|---|
| | 204° C. | 288° C. | 204° C. pre-sulphided § | 288° C. pre-sulphided § | 204° C. pre-reduced * |
| 2 Pd | 0.63 | 0.35 | 1.53 | 0.8 | |
| 5 Pd | 1.28 | 0.71 | 2.09 | | 1.05 |
| 10 Pd | 2.7 | 1.59 | 5.15 | | |
| 2 Pt | 0.14 | 0.06 | 0.08 | | |

† All samples supported on γ $Al_2O_3$
§ presulphided at 300° C., 40 ppm $SO_2$, 1% $H_2/N_2$, 20 hrs
* pre-reduced at 300° C., 1% $H_2/N_2$, 20 hrs It can readily be seen that pre-sulphiding increases the capacity for mercury by approximately a factor of two. In contrast, Pt-based absorbers have a lower capacity, and that is reduced further by pre-sulphiding. Pre-reduction was carried out for the 5% wt % Pd absorber, but exhibited a reduction in capacity compared to the untreated absorbent.

Example 2

Pre-sulphided 5% Pd/$Al_2O_3$ and 10% Pd/$Al_2O_3$ and 2% Pd/$Al_2O_3$ were all studied by conventional temperature programmed reduction ("TPR"). XRD studies were also carried out as illustrated in the following Table 2:
Table 2

TABLE 2

| Pre-treatment | 2-Theta | Pd phase |
|---|---|---|
| Presulphided § + Hg* | 75.5 | HgPd |
| Hg* | 79.5 | solid solution of Hg in Pd |
| Reduced 204° C., no Hg | 82.1 | Pd |

§ presulphided at 300° C., 40ppm $SO_2$, 1% $H_2/N_2$, 20 hrs
*Hg adsorption at 204° C.
$Pd_4S$ gives several distinct peaks in the 2-Theta range 72-81

§presulphided at 300° C., 40 ppm $SO_2$, 1% $H_2/N_2$, 20 hrs
* Hg adsorption at 204° C.
$Pd_4S$ gives several distinct peaks in the 2-Theta range 72-81

A $Pd_4S$ phase was identified in the 5% and 10% samples, but for the 2% sample, the signal was below the equipment detection level.

Example 3

The activities of various samples towards catalysing the methanation of syn-gas were studied in a microreactor. A bed of 0.5 g of absorbent sample, having a particle size of 250 to 355 microns had 420 ml/min of a model syn-gas passed through at atmospheric pressure, and methane was detected in the microreactor outlet gas, using a gas analyser. The model syn-gas was composed of around 21% $H_2$, 27% CO, 3% $CO_2$, 45% $N_2$ and 4% water vapour. The space velocity of gas through the catalyst bed was calculated to be 50,400 ml/$g_{cat}$/hr. All the sulphided samples (2%, 5% and 10% Pd) exhibited negligible methane formation up to 480° C., whereas there was significant methane formation of up to 1% methane in the outlet gas at 480° C., rising to 5% at 550° C., with both of the unsulphided samples tested (2% and 10% Pd).

Example 4

Alumina support was loaded with 2 wt % and 5 wt % palladium or 2 wt % platinum in conventional manner. Each sample was then pre-sulphided using 100 ppm $H_2S$ in nitrogen, at a temperature of 204° C., until there was breakthrough of $H_2S$. Using the method previously described in Example 1, the samples were tested at 204° C. and 288° C., and the loading of mercury determined, with the following results:

| Loading metal wt % | Hg content wt % at 204° C. | Hg content wt % at 288° C. |
|---|---|---|
| 2 Pd | 0.94 | ND |
| 5 Pd | 3.54 | 1.96 |
| 2 Pt | 0.12 | ND |

In this case, no $Pd_4S$ was observed by xrd prior to Hg adsorption, and in fact only alumina was detected, indicating that any Pd—S phase is amorphous, although sulphur was detected by wet chemical analysis. After Hg adsorption, a HgPd phase was detected, although a structure could not be allocated.

The invention claimed is:

1. A method of reducing the heavy metal content of high temperature gases containing heavy metal comprising passing the high temperature gases over an absorbent to reduce the heavy metal content of the high temperature gases, wherein the absorbent is a sulphided palladium-containing absorbent containing greater than about 1.5 wt % palladium, measured as metal; and
wherein the temperature of the gases is higher than about 200° C.

2. A method according to claim 1, wherein the absorbent is carried on a support.

3. A method according to claim 2, wherein the support is γ-alumina.

4. A method according to claim 2, wherein the loading of palladium on the support is approximately 2 wt %.

5. A method according to claim 2, wherein the support is selected from the group consisting of silica, titania, zirconia, aluminosilicates, yttria, inactive carbon-based materials and combinations thereof.

6. A method according to claim 2, wherein the support is alumina.

7. A method according to claim 1, wherein the sulphided absorbent is produced by pre-sulphiding using a source of sulphur in a reducing atmosphere.

8. A method according to claim 7, wherein $H_2S$ is used to sulphide the absorbent.

9. A method according to claim 1, wherein $H_2S$ is used to sulphide the absorbent.

10. A method according to claim 1, wherein the sulphided absorbent comprises $Pd_4S$.

11. A method according to claim 1, wherein the heavy metal is selected from the group consisting of mercury, arsenic, selenium and cadmium.

12. A method according to claim 1, wherein the heavy metal is mercury.

13. A method according to claim 12, wherein the mercury forms a HgPd phase.

14. A method of reducing the heavy metal content of process-derived high temperature gases comprising passing the process-derived high temperature gases over an absorbent, wherein the absorbent is a sulphided palladium-containing absorbent containing greater than about 1.5 wt % palladium, measured as metal; and wherein the temperature of the gases is higher than about 200° C.

15. A method according to claim 1, wherein the heavy metal is arsenic.

* * * * *